(12) United States Patent
Robles

(10) Patent No.: US 6,200,364 B1
(45) Date of Patent: Mar. 13, 2001

(54) PROCESS FOR ELUTING PRECIOUS METALS FROM ACTIVATED CARBON

(76) Inventor: Antonio T. Robles, 17 Furlong St., Kirkland Lake, ON (CA), P2N 3P5

(*) Notice: Subject to any disclaimer, the term of this patent is extended or adjusted under 35 U.S.C. 154(b) by 0 days.

(21) Appl. No.: 09/372,025

(22) Filed: Aug. 13, 1999

(51) Int. Cl.$^7$ .................................................. C22B 3/24
(52) U.S. Cl. ................... 75/744; 423/24; 502/22; 502/418; 502/421; 502/423; 210/670; 210/671; 210/672; 210/673; 210/674; 210/675; 210/676; 210/677; 210/678
(58) Field of Search ................................ 75/744; 423/27, 423/34, 24; 502/416, 418, 421, 423, 22; 210/670–678

(56) References Cited

U.S. PATENT DOCUMENTS

| | | | |
|---|---|---|---|
| 2,579,531 | 12/1951 | Zadra | 502/5 |
| 3,935,006 | 1/1976 | Fisher | 423/25 |
| 4,208,378 | 6/1980 | Heinem et al. | 423/27 |
| 4,427,571 | 1/1984 | Parker et al. | 252/364 |
| 4,816,235 | * 3/1989 | Pesic | 432/32 |
| 4,968,346 | 11/1990 | Belsak et al. | 423/29 |
| 5,073,354 | 12/1991 | Fuller et al. | 423/24 |
| 5,176,886 | 1/1993 | Darnell et al. | 423/29 |
| 5,769,925 | 6/1998 | Harvey et al. | 75/710 |

OTHER PUBLICATIONS

R. J. Davidson; D. Duncanson; *J. South Afr. Inst. Min. Metall.*, v. 77, n. 12, pp. 254–261, (1977); Jul. The Elution of Gold from Activated Carbon Using Deionized Water; 8pgs.

R. J. Davidson; V. Veronese; *J. South Afr. Inst. Min. Metall.*, v. 79, n. 19, pp. 437–445, (1979); Oct. Futher Studies on the Elution of Gold fom Activated Carbon using Water as the Elutant; 9pgs.

D. M. Muir; W. D. Hindchliffe; A. Griffin; *Hydrometallurgy*, v. 14, pp. 151–169, (1985) No Month Elution of Gold from Carbon by the Micron Solvent Distillation Procedure; 19pgs.

F. Espiell; A. Roca; M. Cruells; C. Nunez; *Hydrometallurgy*, v. 19, pp. 321–333, (1988); Gold No Month Desorption from Activated Carbon with Dilute Naoh–Organic Solvent Mixtures; 13pgs.

R. J. Davidson; *J. South Afr. Inst. Min. Metall.*, v. 75, n. 67, pp. 67–76, (1974); The Mechanism Nov. of Gold Adsorption on Avtivated Charcoal; 10pgs.

J. S. J. van Deventer; p.F. van Der Merwe; *Metall. Mat. Trans. B.* v. 25, n. 6, pp. 829–837, Dec. (1994); The Mechanism of Elution of Gold Cyanide from Activated Carbon; 9pgs.

Y. E. Jia; C. J. Steele; K.M. Thomas; *Carbon.* v. 36, n. 9, pp. 1299–1308, (1998); Mechanism No Month of Adsorption of Gold and Silver Species on Activated Carbons; 10pgs.

* cited by examiner

Primary Examiner—Roy V. King
Assistant Examiner—Tima McGuthry-Banks
(74) Attorney, Agent, or Firm—Sheridan Ross P.C.

(57) ABSTRACT

A process is disclosed for the recovery of gold and/or silver values from activated carbon, wherein they are adsorbed as cyanide complexes. The process uses an eluant containing sugar. The process allows the eluant to pass through fresh carbon twice, thereby reducing the volume of the gold-loaded eluant. This, in turn, reduces the size of the electrowinning or zinc precipitation circuits. The process also improves elution efficiency when barren electrowinning solution is recycled in the elution process.

39 Claims, 8 Drawing Sheets

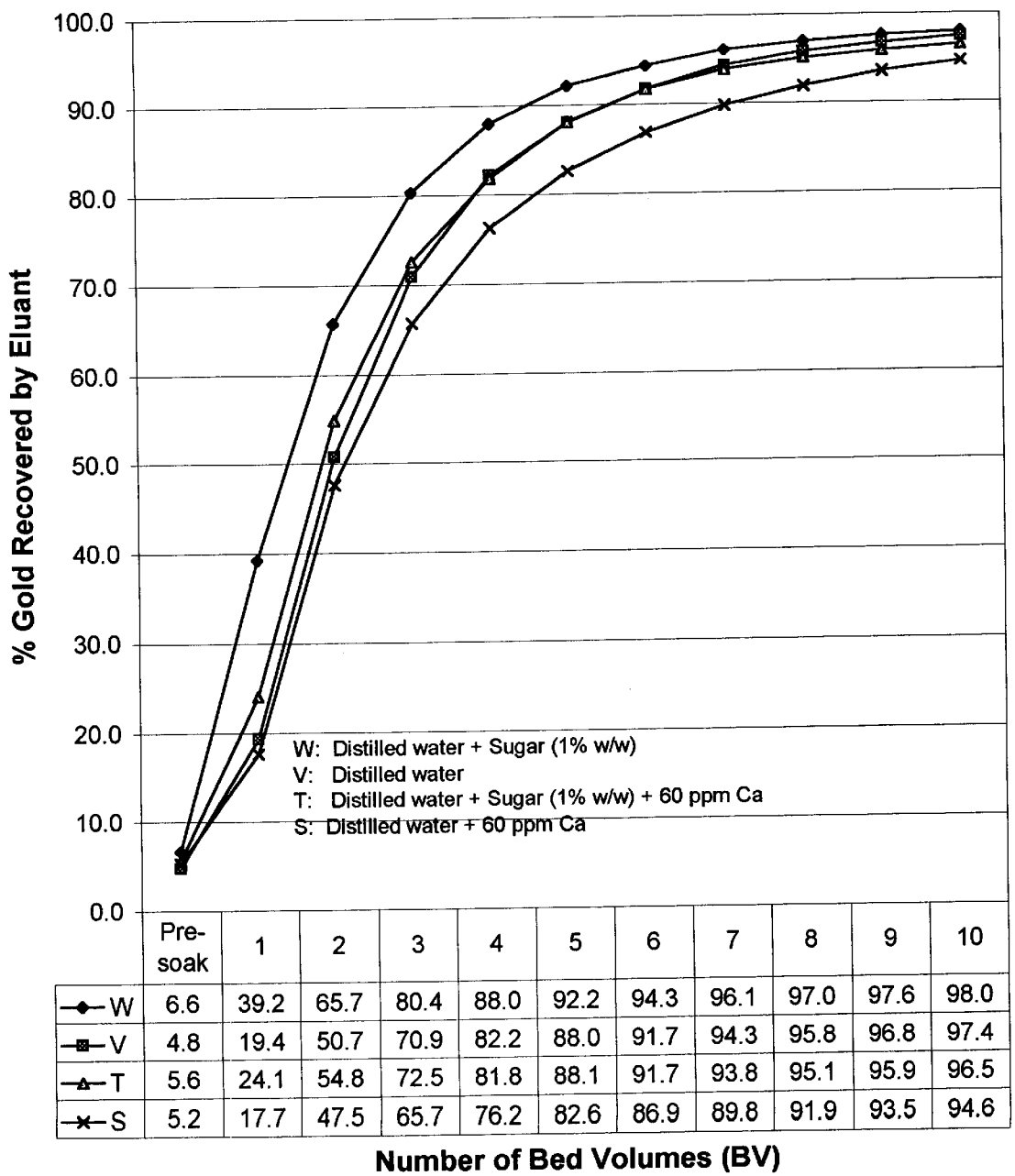
FIG. 2-A

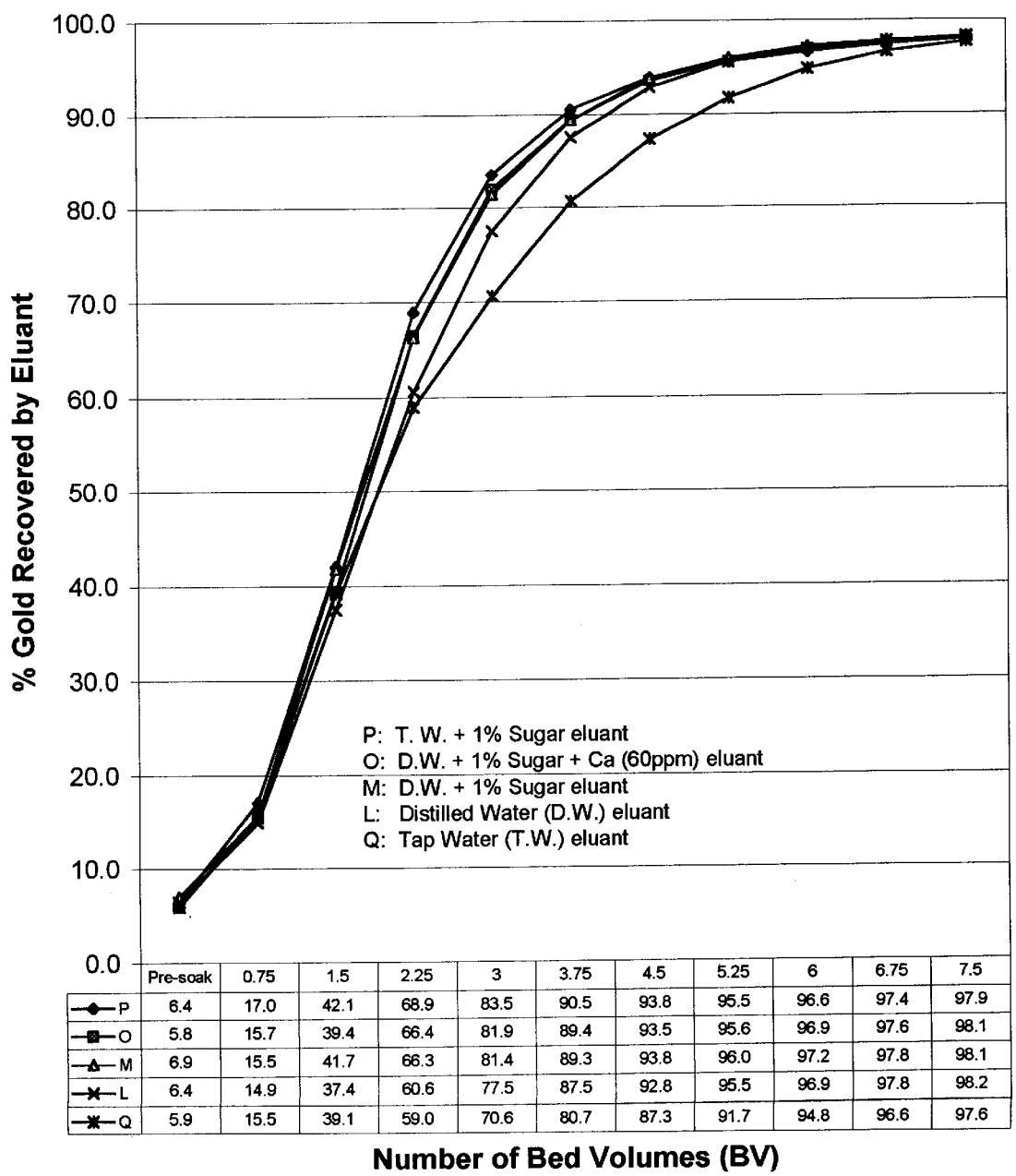
FIG. 2-B

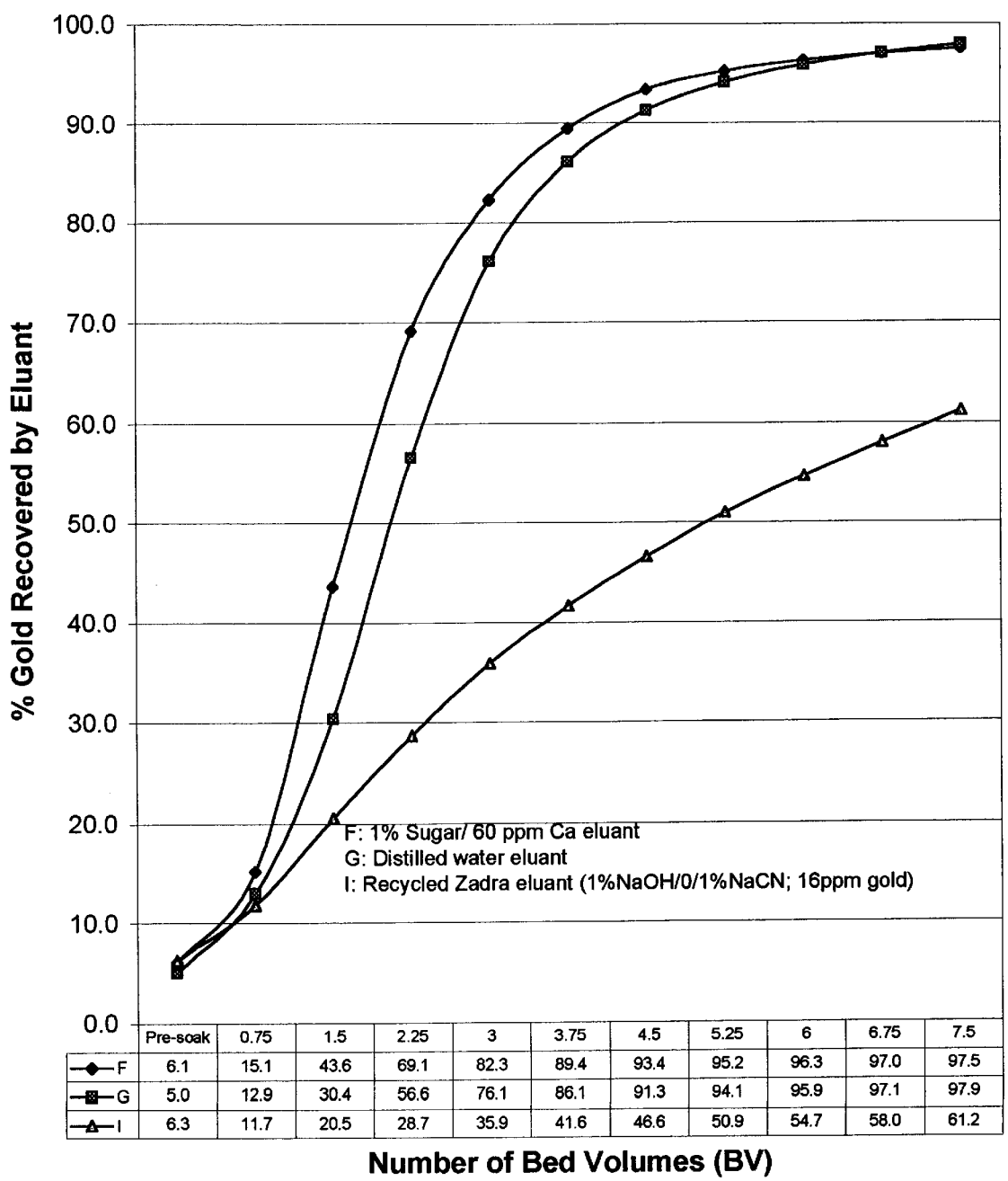
FIG. 2-C

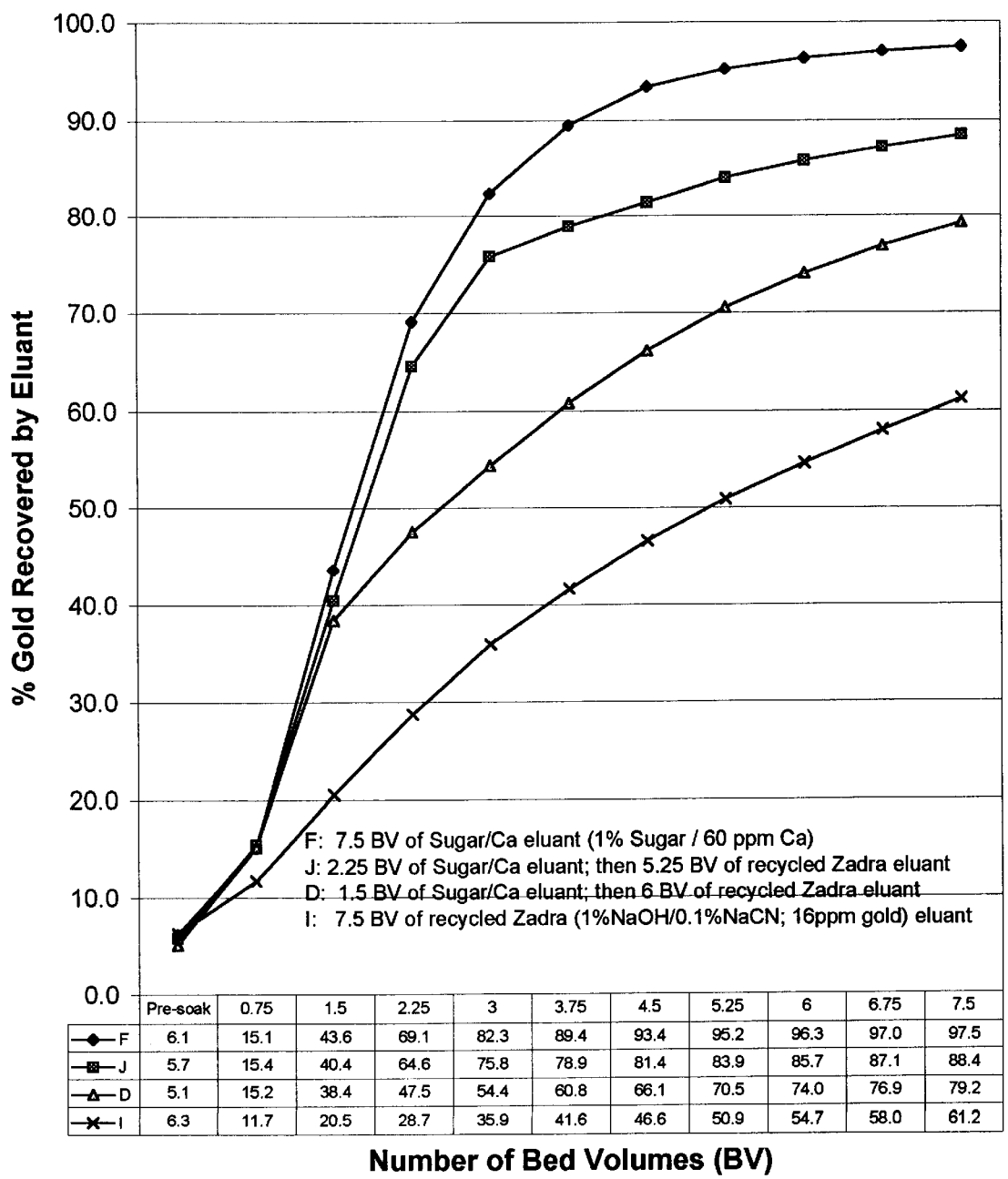
FIG. 2-D

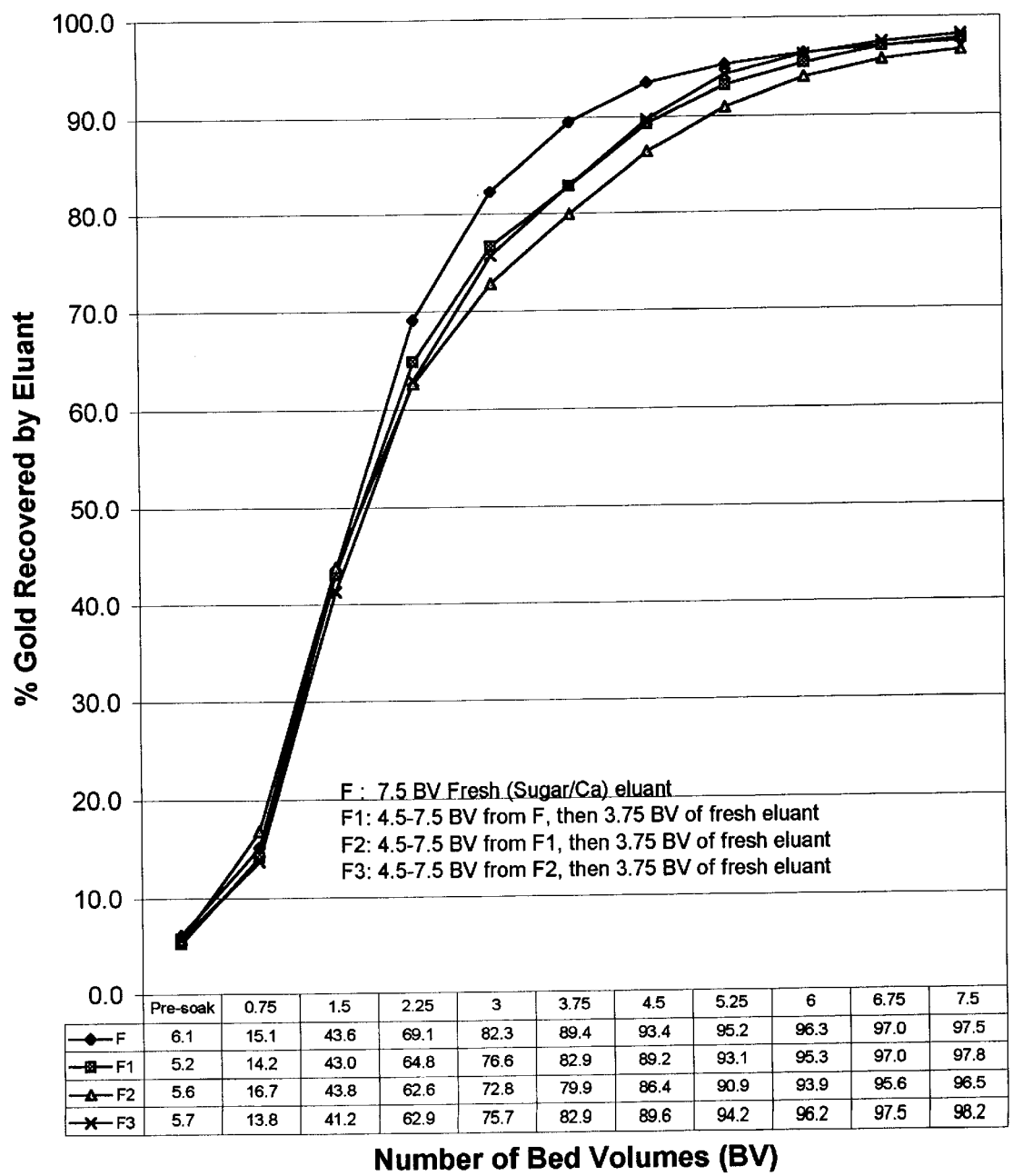

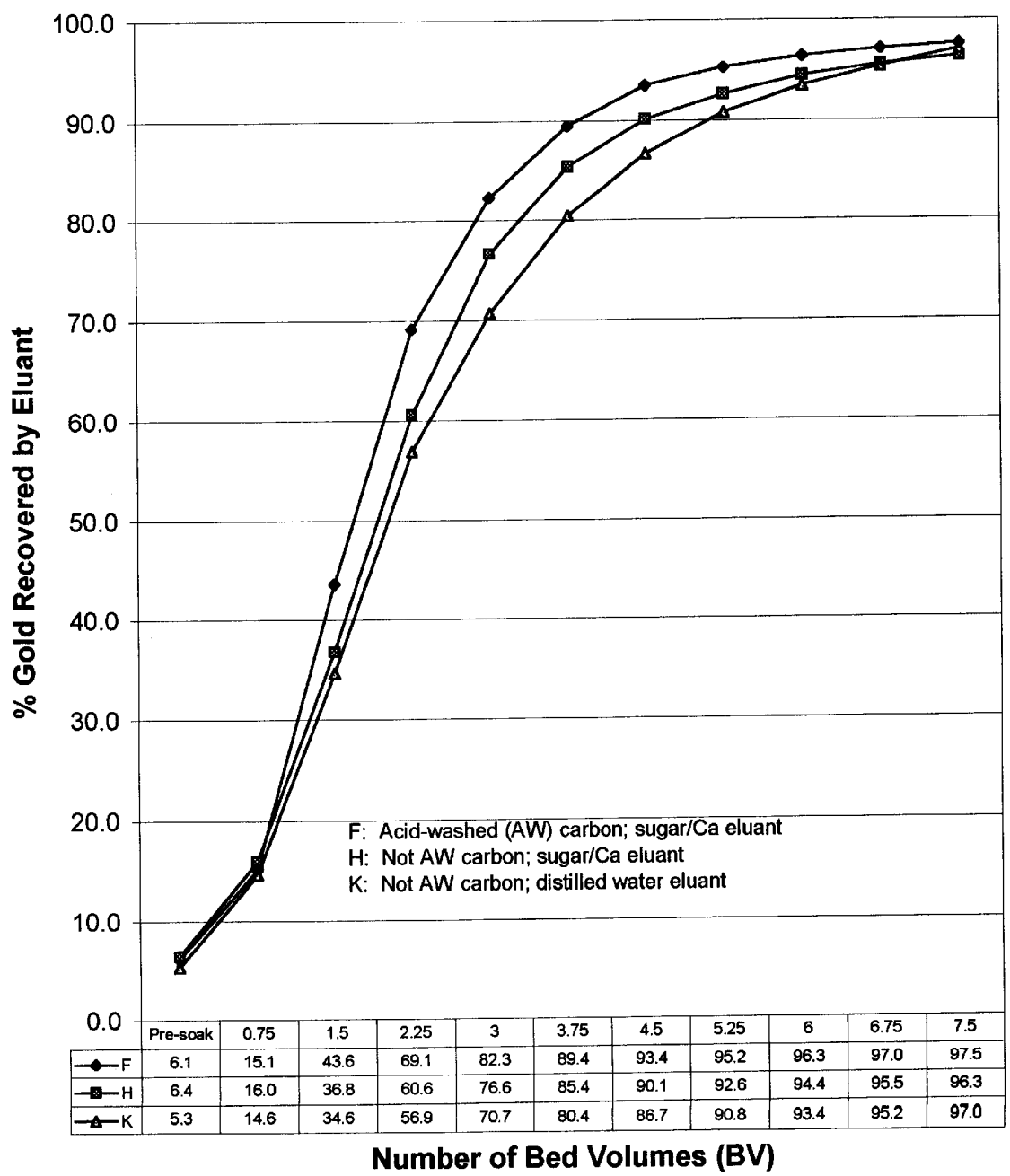
FIG. 2-F

PROCESS FOR ELUTING PRECIOUS METALS FROM ACTIVATED CARBON

BACKGROUND—FIELD OF INVENTION

This invention relates to the recovery of precious metals from activated carbon, specifically to an improved elution process.

BACKGROUND—DESCRIPTION OF PRIOR ART

Cyanidation is commonly employed for the extraction of gold from its ores. In this process, the crushed ore is treated with a dilute solution of sodium cyanide (NaCN), and a small amount of lime (CaO) to maintain a pulp pH of >9. In the presence of oxygen, gold dissolves forming gold cyanide complex.

Recovery of the gold is accomplished by adsorbing the gold cyanide complex on activated carbon. A variety of processes based on this reaction have been developed. Effectiveness of these processes is, however, dependent on the development of an efficient means of eluting the gold from the gold-loaded carbon.

The most common commercial methods for the elution of gold cyanide from activated carbon are the Zadra (U.S. Pat. No. 2,579,531, issued Dec. 25, 1951) and Anglo processes.

In the latest Zadra elution process, hot solution of 1% weight/volume (w/v) sodium hydroxide (NaOH) and 0.2% w/v NaCN are recycled through a gold-loaded activated carbon bed for up to 72 hours at 95–100° C. to elute gold cyanide. A modified Zadra process operating at 140° C. in a pressurized system reduces elution time to 10–12 hours.

In the Anglo elution process, gold-loaded activated carbon is soaked in a solution containing 3–5% w/v NaCN and 1% w/v NaOH followed by elution for 8–12 hours with deionized water at 100–120° C. The eluant solution is not recirculated; therefore, it is a once-through process.

The recycling of the weak gold-loaded eluant from the "tail-end" of an elution cycle to the beginning of the next elution cycle is practiced successfully both in the Zadra and Anglo processes. However, in the Zadra, high gold value in the recycled eluant slows down the elution process.

While both the Zadra and Anglo processes are effective in eluting gold from activated carbon, these processes suffer from high energy consumption, high capital costs for pressurized operations, and a long elution period. Although, conducting the elution under pressure or modifying the eluant with organic compounds also improves the rate of elution, these processes are complicated to implement.

I will now relate other attempts to elute gold from activated carbon involving the use of temperatures lower than those used in the Zadra or the Anglo elution process. D. M. Muir tried to elute gold by pretreating gold-loaded activated carbon with a solution of sodium cyanide and sodium hydroxide, and then eluting the carbon with methanol, ethanol, or acetonitrile vapors and condensate at 65–80° C. Using this process, he eluted gold cyanide in 4–6 hours. However this process requires an expensive sealed system to minimize (1) fire hazards of electrowinning due to the flammable organic solvent and, (2) solvent losses due to evaporation.

F. Espiell tried to elute gold from activated carbon using mixtures of NaOH (20 g/L) and 50% aqueous organic solvents at 30° C. He found that this acetone-water-hydroxide method was most efficient at gold desorption with over 90% of the gold being eluted in less than 40 minutes. However, a loss in gold-binding activity resulted over several loading/eluting cycles. This loss resulted from the failure of the acetone solvent system to elute the gold most strongly adsorbed to the activated carbon.

Heinen et al., U.S. Pat. No. 4,208,378, tried to elute gold at 70–160° C. with a solution of about 20–30% v/v water soluble alcohol and about 80–70% aqueous solution with a strong base of sodium or potassium hydroxide.

Parker et al., U.S. Pat. No. 4,427,571, tried to elute gold from activated carbon using at least 20% v/v polar organic solvents or mixture of polar organic solvents, preferably, nitrites containing sodium cyanide or sodium thiocyanate.

Harvey et al., U.S. Pat. No. 5,769,925, tried to elute gold by adding a powerful reducing agent, such as hydrazine monohydrate, to standard eluants, such as NaOH/NaCN with or without alcohol.

Belsak et al., U.S. Pat. No. 4,968,346, tried to elute gold using an eluant of about 2–3% v/v alcohol and 97–98% v/v deionized water. This approach involves adding to the eluant at least 2.5% w/w of a strong base (sodium or potassium hydroxide) and at least 0.3% w/w sodium or potassium cyanide.

Fuller et al., U.S. Pat. No. 5,073,354, tried to elute gold using as an eluant a compound containing the carboxylate functionality, selected from benzoic or substituted benzoic acids and polyacrylic acids of less than about 100,000 M. W.

Fisher, U.S. Pat. No. 3,935,006, tried to elute gold using, as eluants, water-soluble alcohols or ketones alone or with their aqueous solutions. Adding a strong base of sodium or potassium hydroxide facilitate elution.

In prior art, sodium cyanide and sodium hydroxide are universally used in the elution process. The importance of these two reagents in the elution process is illustrated in numerous studies on the mechanism of adsorption and elution of gold cyanide from activated carbon. Thus, Davidson established that the addition of "spectator cations" could enhance appreciably the gold adsorption following the sequence, $Ca^{2+}>Mg^{2+}>H^+>Li^+>Na^+>K^+$. He proposed a mechanism involving the adsorption of gold as ion pair $M^{n+}[Au(CN)_2^-]_n$, and the use of the cations to preserve electroneutrality as counter ions in the electrical double layer.

According to Van Deventer, the presence of spectator cations ($Mn^{n+}$) enhances the formation of $Mn^{n+}[Au(CN)_2^-]_n$ ion pairs on the carbon, which in turn suppresses the elution of gold cyanide. When the concentration of cations in the eluant is high and cyanide is absent from the solution or the carbon, very little desorption of gold is observed. Free cyanide in the eluant, which causes some competitive adsorption of cyanide with gold cyanide, plays a minor role at the elevated temperatures used in the industry. A more important effect of cyanide is its reaction with functional groups on the carbon, the products of which passivate the surface for adsorption of gold cyanide, with cyanide enhancing the elution of gold cyanide. The degree of passivation, which is determined to a large extent by the temperature of pretreatment, also affects the elution of cations and the degradation/adsorption of cyanide itself.

As the following table shows, conditions that enhance elution hinder adsorption.

| Conditions Favoring Adsorption | Conditions Favoring Elution |
| --- | --- |
| Low temperatures | High temperatures |
| Low cyanide concentrations | High cyanide concentrations |
| Low Alkalinity | High Alkalinity |
| High ionic strength medium | Low ionic strength medium |
| Presence of $Ca^{+2}$, $Mg^{+2}$ | Absence of $Ca^{+2}$, $Mg^{+2}$ |

Jia observed that ethanol and butanol, adversely affect gold adsorption. He also observed that low pH increased adsorption of gold and silver cyanide whereas organic solvents and high temperatures decreased gold and silver adsorption.

In summary, prior methods of eluting gold cyanide from activated carbon called for:

(a) A high temperature/pressure pre-soak of the loaded carbon with NaCN/NaOH solution followed with hot deionized water;

(b) A high temperature/pressure elution with aqueous NaCN/NaOH;

(c) Organic solvents or compounds which contain aqueous NaCN/NaOH; or (d) Relatively complex unit operations involving distillation with aqueous NaCN/NaOH, such as the Micron process.

These prior methods had the following disadvantages:

(a) high energy costs because of elution at high temperatures;

(b) lengthy elution period;

(c) requirement for high quality water (Anglo process);

(d) expensive organic solvents or compounds, or both;

(e) fire hazards associated with organic solvents; or (f) large volumes of gold-loaded eluant.

Thus, there is a need for a fast, safe, low-temperature, and efficient process for eluting gold cyanide from activated carbon for the recovery of metallic gold from aqueous solutions containing gold cyanides. My invention fills that need.

Summary

The present invention relates to the recovery of precious metals, such as gold and silver, from activated carbon. The process employs an eluant containing a carbohydrate, such as sugar. In one configuration, the process allows the eluant to pass through the activated carbon twice, thereby reducing the volume of the precious metal-loaded eluant. This, in turn, reduces the size of the electrowinning or zinc precipitation circuits. The process also improves elution efficiency when barren electrowinning solution is recycled in the elution process.

In another configuration, the process of the present invention shows that the presence of sugar enhances the elution of gold cyanide from activated carbon. Passing the eluant through fresh carbon twice can reduce the volume of gold-loaded eluant by 50% without sacrificing elution efficiency. The elution efficiency of recycled electrowinning solution can be increased by first eluting the carbon with fresh eluant and then with the recycled electrowinning solution.

Objects and Advantages

Accordingly, besides the objects and advantages of the elution process described in my above patent, several objects and advantages of the present invention are:

(a) provides a fast and efficient elution process at 95–98° C.;

(b) provides an elution process that is simpler and cheaper to operate than existing processes;

(c) provides an elution process that can be easily adapted to existing processes;

(d) provides an elution process free of fire hazards associated with the use of organic solvents;

(e) provides an elution process that is energy efficient;

(f) provides an elution process that can use commonly available water instead of deionized water; and (g) reduces the volume of gold-loaded eluant which, in turn, reduces the size of the electrowinning or zinc precipitation circuits.

The description and drawings below show additional objects and advantages.

BRIEF DESCRIPTION OF THE DRAWINGS

FIG. 2-A shows the effect of calcium on elution efficiency with or without sugar.

FIG. 2-B shows the elution recovery curve for sugar, sugar/calcium, and without sugar in distilled water and tap water.

FIG. 2-C shows the elution recovery curve of my elution process in relation to the Zadra and Anglo processes.

FIG. 2-D shows an improvement over the Zadra process brought about by using sugar/calcium eluant in the first 1.5 BV, 2.25 BV, and then a recycled Zadra eluant.

FIG. 2-E shows the elution recovery curve of my elution process demonstrating the advantage of passing the eluant through fresh carbon twice.

FIG. 2-F shows the elution recovery curve of an acid-washed carbon in relation to a non-acid-washed carbon.

PREFERRED EMBODIMENT—DESCRIPTION

Figure 1:
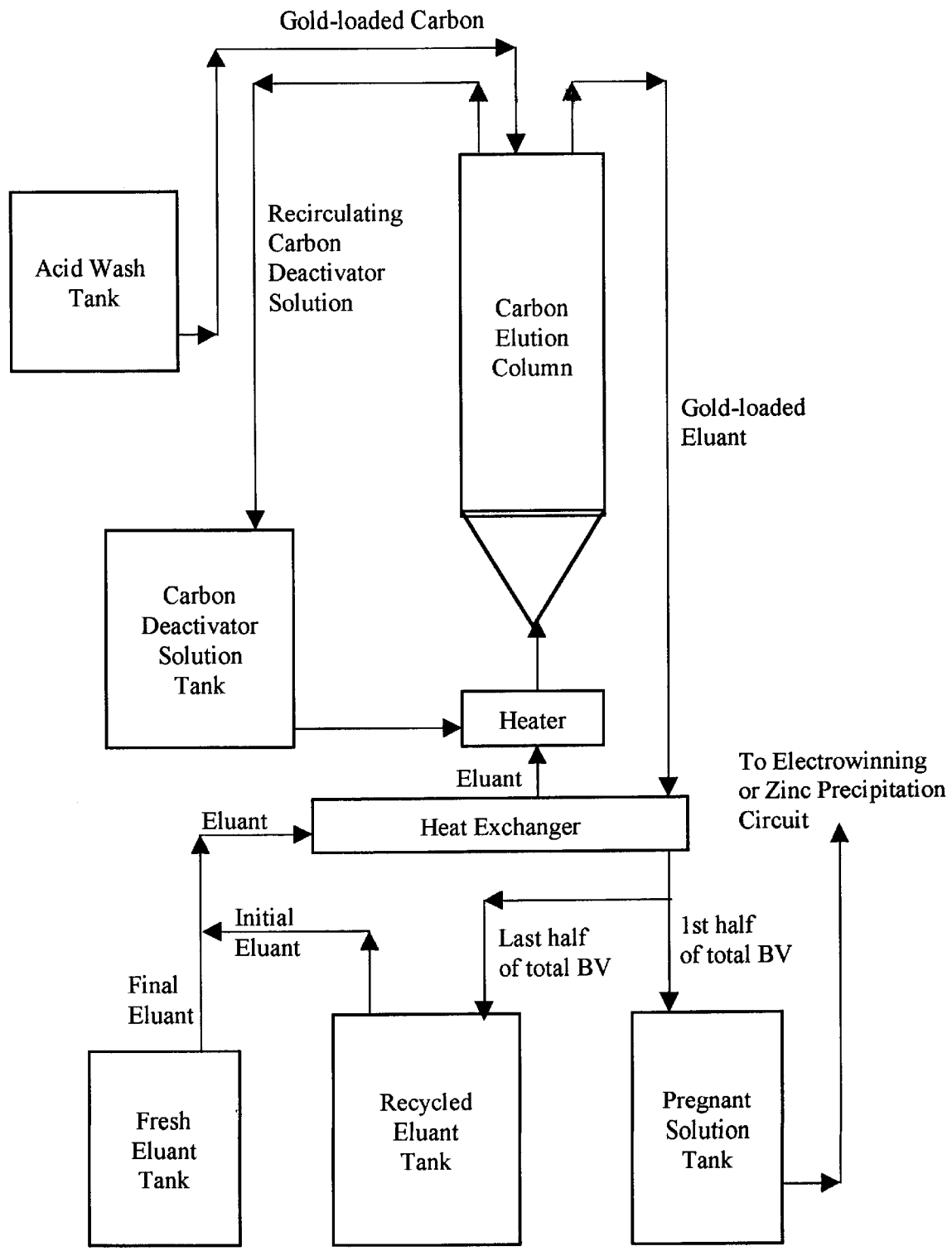
FIG. 1 shows the major components and flow directions of my elution process.

A preferred process involving selected major operations is shown in FIG. 1. The gold-loaded carbon is acid-washed, water-rinsed, and neutralized in the Acid Wash Tank. The gold-loaded carbon is then transferred to the Carbon Elution Column and preheated to operating temperatures of 95–98° C. by recirculating a hot carbon deactivator solution introduced at the bottom of the tank. After one hour at 95–98° C., the carbon deactivator solution is drained back to the Carbon Deactivator Solution Tank and can be reused for the next batch of carbon. Recycled or fresh eluant is pre-heated in the heat exchanger and heated to 98° C. by a heater before entering the bottom of the Carbon Elution Column. The gold-loaded eluant flows out the top of the tank and is cooled down by a heat exchanger before it flows into the Pregnant Solution Tank or the Recycled Eluant Tank. From the Pregnant Solution Tank, the gold-loaded eluant goes to the electrowinning cells or the zinc precipitation circuit.

PREFERRED EMBODIMENT—OPERATION

This part describes how my invention operates in reference to FIG. 1.

As indicated in FIG. 1, the gold-loaded carbon is prepared for elution by acid washing in the Acid Wash Tank at about pH 1 with 3–5% v/v mineral acid solution, such as nitric acid or hydrochloric acid. This pretreatment is meant to: (a) dissolve carbonate scale and reduce levels of silica, magnesium, aluminum, and other metals; (b) reduce overall contaminant levels in the pores of the carbon; and (c) remove grit, wood fiber, plastics and residual slime by screens integrated into the operation. The acid-washed carbon is rinsed with water and neutralized to about pH 10 with minimal amount of sodium hydroxide.

The acid-washed carbon is transferred from the Acid Wash Tank to the Carbon Elution Column. The temperature of the carbon is raised to 95–98° C. by recirculating a hot carbon deactivator solution (3–5% w/v NaCN) through the carbon column. Recirculating the hot solution through the carbon will: (a) raise the carbon temperature to the desired elution temperature; (b) convert the adsorbed gold on the carbon into an elutable form; and (c) minimize gold adsorption by the carbon. This step takes about one hour after the carbon has reached operating temperature of 95–98° C. The solution is then drained back into the Carbon Deactivator Solution Tank. If the presence of hydrogen cyanide in the Carbon Deactivator Solution causes concern, a small amount of sodium hydroxide may be added.

Hot (95–98° C.) eluant from the Recycled Eluant Tank or Fresh Eluant Tank at 1.5 to 2 bed volumes (BV) per hour is passed through the carbon column to elute the gold from the carbon. The fresh eluant is prepared by adding 1% w/w sucrose into commonly available water, such as Process Water or Thickener Overflow Water. Fresh eluant should contain 1% sugar and the recycled eluant sugar concentration may be increased to 2% by adding sugar into the Recycled Eluant Tank.

Assuming the total volume of eluant used in the elution process is 10 BV, the first 5 BV comes from the Recycled Eluant Tank and the last 5 BV comes from the Fresh Eluant Tank. The first 5 BV of gold-loaded eluant coming out of the Carbon Elution Column goes to the Pregnant Solution Tank and the last 5 BV of gold-loaded eluant goes back to the Recycled Eluant Tank. This cycle is repeated with every batch of carbon.

At this point, gold can be recovered from the gold-loaded eluant in the Pregnant Solution Tank by either zinc precipitation or electrowinning.

In my method, the recycled eluant usually contains 100–200 ppm gold in contrast to a Zadra solution, which is recycled from the electrowinning cells that normally has less than 20 ppm gold. In a Zadra process, eluant containing high concentrations of gold significantly slows down the elution process because equilibrium conditions prevent the efficient elution of gold from the carbon.

Standard conditions used in the examples below are as follows:

(a) The samples were dried Carbon-in-Leach (CIL) carbons.
(b) The carbons were acid-washed with nitric acid solution at pH 1 and neutralized to about pH 10, unless otherwise noted.
(c) Elution Temperature: 95–98° C.
(d) Carbons were treated for one hour with hot recirculating 5% NaCN solution to reduce its activity.
(e) Eluant flow: 1.5 bed volumes per hour except in Example 1 (used 2 BV/h)
(f) Duration of elution: 5 hours The sugar/calcium eluant in these examples consists of distilled water or tap water with lime.

My elution process is further illustrated by the following examples.

EXAMPLE 1

FIG. 2-A and Table 1 show how the calcium ions affect the elution recovery curve for distilled water with and without sugar.

TABLE 1

| Eluant | Carbon Assay (ppm) | | % Gold Recovered AFTER (HOURS) | | | | |
| --- | --- | --- | --- | --- | --- | --- | --- |
|  | Head | Tail | 1 | 2 | 3 | 4 | 5 |
| W D.W. +1% Sugar | 5773 | 118 | 65.7 | 88.0 | 94.3 | 97.0 | 98.0 |
| V D.W. +1% Sugar + 60 ppm Ca | 6850 | 175 | 50.7 | 82.2 | 91.7 | 95.8 | 97.4 |
| T Distilled Water (D.W.) | 6444 | 228 | 54.8 | 81.8 | 91.7 | 95.1 | 96.5 |
| S Distilled Water + 60 ppm Ca | 6863 | 370 | 47.5 | 78.2 | 86.9 | 91.9 | 94.6 |

EXAMPLE 2

FIG. 2-B and Table 2 show my elution method similar to Example 1 at 1.5 BV per hour and using tap water.

TABLE 2

| | Eluant | Carbon Assay (ppm) | | % Gold Recovered AFTER (HOURS) | | | | |
|---|---|---|---|---|---|---|---|---|
| | | Head | Tail | 1 | 2 | 3 | 4 | 5 |
| P | Tapwater (10 ppm Ca) + 1% Sugar | 6525 | 135 | 42.1 | 83.5 | 93.8 | 96.6 | 97.9 |
| O | Distilled Water + 1% Sugar + Ca (60 ppm) | 6109 | 117 | 39.4 | 81.9 | 93.5 | 96.9 | 98.1 |
| M | Distilled water + 1% Sugar | 6054 | 112 | 41.7 | 81.4 | 93.8 | 97.2 | 98.1 |
| L | Distiiled Water | 6361 | 117 | 37.4 | 77.5 | 92.8 | 96.9 | 98.2 |
| Q | Tap Water (10 ppm Ca) | 6259 | 149 | 39.1 | 70.6 | 87.3 | 94.8 | 97.6 |

EXAMPLE 3

FIG. 2-C and Table 3 show the elution profile of my elution process in relation to the Zadra and Anglo processes. My elution process has a higher rate of elution than the Anglo or Zadra processes, particularly at the early stages of the elution cycle.

TABLE 3

| | Eluant | Carbon Assay (ppm) | | % Gold Recovered AFTER (HOURS) | | | | |
|---|---|---|---|---|---|---|---|---|
| | | Head | Tail | 1 | 2 | 3 | 4 | 5 |
| F | 1% Sugar + 70 ppm Ca | 6692 | 165 | 43.6 | 82.3 | 93.4 | 96.3 | 97.5 |
| G | Anglo - Distilled water | 6937 | 143 | 30.4 | 76.1 | 91.3 | 95.9 | 97.9 |
| I | Zadra - Recycled Barren Solution, 1% NaOH + 0.1% NaCN, 16 ppm Au | 6540 | 2540 | 20.5 | 35.9 | 46.8 | 54.7 | 61.2 |

EXAMPLE 4

FIG. 2-D and Table 4 show one way of improving the performance of the Zadra process. The eluant in the Zadra process is recycled and has a "bleed" to reduce the build-up of deleterious concentration of salts in the eluant. Normally, this bleed represents 10–30% of the total volume of eluant. Fresh solution is added to the recirculating eluant to replace the bleed solution. Instead of adding the fresh eluant into the recirculating eluant, the fresh eluant of sugar/calcium is used as the initial eluant solution. The higher the percentage of fresh eluant, the greater the efficiency of elution.

TABLE 4

| | Eluant | Carbon Assay (ppm) | | % Gold Recovered AFTER (HOURS) | | | | |
|---|---|---|---|---|---|---|---|---|
| | | Head | Tail | 1 | 2 | 3 | 4 | 5 |
| F | 7.5 BV Sugar/calcium solution | 6692 | 165 | 43.6 | 82.3 | 93.4 | 96.3 | 97.5 |
| J | 2.25 BV Sugar/Ca, then 5.25 BV Zadra (5% sugar) | 6736 | 779 | 40.4 | 75.8 | 81.4 | 85.7 | 88.4 |
| D | 1.5 BV Sugar/Ca, then 6 BV Zadra (5% sugar) | 6741 | 1400 | 38.4 | 54.4 | 66.1 | 74.0 | 79.2 |
| I | 7.5 BV Recycled Zadra solution | 6560 | 2540 | 20.5 | 36.1 | 46.7 | 54.8 | 61.3 |

EXAMPLE 5

FIG. 2-E and Table 5 show the elution efficiency of the sugar/calcium eluant in three successive cycles. The elution profiles show that the eluant can be recycled without negative effect.

TABLE 5

| | | Eluant | Carbon Assay (ppm) | | % Gold Recovered AFTER (HOURS) | | | | |
|---|---|---|---|---|---|---|---|---|---|
| Cycle | No. | (Recycled Eluant - last half BV of the elution cycle) | Head | Tail | 1 | 2 | 3 | 4 | 5 |
| F | 0 | 7.5 BV - 1% Sugar + 60 ppm Ca in Tap Water | 6692 | 165 | 43.6 | 82.3 | 93.4 | 96.3 | 97.5 |
| F1 | 1 | 3.75 BV - Recycled Eluant from Cycle 0, then 3.75 BV - Fresh Eluant | 6644 | 149 | 43.0 | 76.6 | 89.2 | 95.3 | 97.8 |
| F2 | 2 | 3.75 BV - Recycled Eluant from Cycle 1, then 3.75 BV - Fresh Eluant | 6840 | 236 | 43.8 | 72.8 | 86.4 | 93.9 | 96.5 |
| F3 | 3 | 3.75 BV - Recycled Eluant from Cycle 2, then 3.75 BV - Fresh Eluant | 6783 | 122 | 41.2 | 75.7 | 89.6 | 96.2 | 98.2 |

EXAMPLE 6

FIG. 2-F and Table 6 compares the elution efficiency of the acid washed carbon and the non-acid washed carbon.

TABLE 6

| | | | Carbon Assay (ppm) | | % Gold Recovered AFTER (HOURS) | | | | |
|---|---|---|---|---|---|---|---|---|---|
| | Treatment | Eluant | Head | Tail | 1 | 2 | 3 | 4 | 5 |
| F | Acid-Washed | Sugar/Ca | 6692 | 165 | 43.6 | 82.3 | 93.4 | 96.3 | 97.5 |
| H | Not-Acid Washed | Sugar/Ca | 6616 | 246 | 36.8 | 76.6 | 90.1 | 94.4 | 96.3 |
| K | Not Acid-Washed | Distilled Water | 6748 | 204 | 34.6 | 70.7 | 86.7 | 93.4 | 97.0 |

Additional Embodiment
Recycling of Barren Electrowinning Solution—Description

Figure 3:
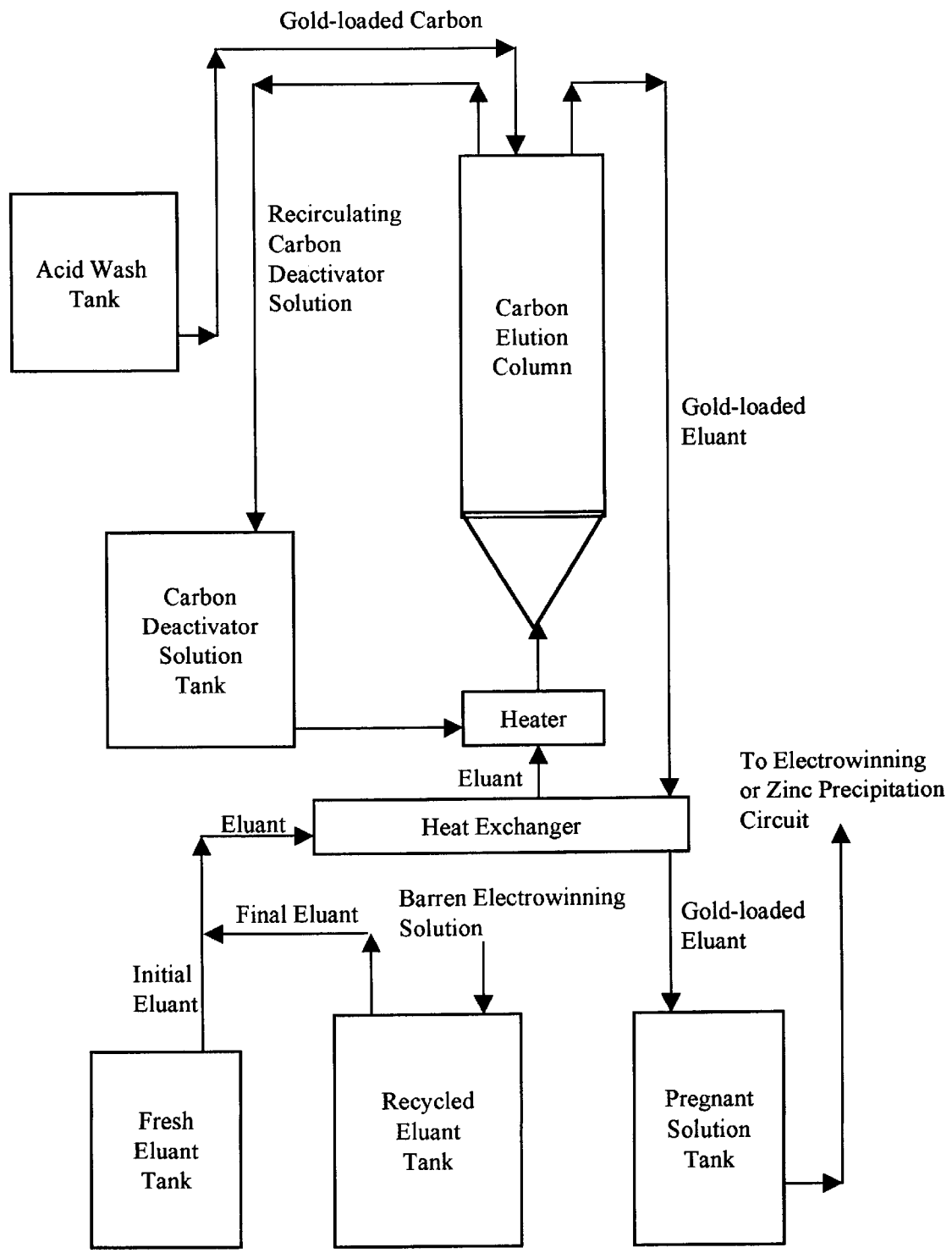
FIG. 3 shows the major components and flow directions of the additional embodiment of my elution process.

An additional embodiment is shown in FIG. 3, where the recycled eluant comes from electrowinning cells.

FIG. 3 shows the major operations of this embodiment. FIG. 3 is the same as FIG. 1 (Preferred Embodiment), except that in FIG. 3:

(a) the input to the Recycled Eluant Tank comes from the electrowinning cells, which is outside of the elution process, rather than within the elution process;

(b) the fresh eluant is introduced into the Carbon Elution Column ahead of the recycled eluant, rather than in the reverse sequence; and (c) all gold-loaded eluants from the Carbon Elution Column are combined in the Pregnant Solution Tank, rather than being split into two streams.

This embodiment relates to the sequence of introducing the eluants (fresh and recycled) into the Carbon Elution Column. The fresh sugar/calcium eluant is introduced first, then the recycled eluant from the electrowinning cells. The gold-loaded eluants are combined in the Pregnant Solution Tank.

Recycling of Barren Electrowinning Solution—Operation

In recovering gold from gold-loaded eluant by electrowinning, reagents, such as sodium hydroxide and sodium cyanide, are added to improve the conductivity of the electrowinning solution. Recycling the barren electrowinning solution back to the elution circuit, thus using a recycled eluant, will reduce the cost of using these reagents.

In an elution/electrowinning circuit with a continuously recirculating of solution, a fraction of the total solution is removed as a "bleed" solution to prevent the build up of deleterious amounts of salts in the system. This bleed solution is about 10–30% of the total volume.

To maintain a constant volume of eluant solution, fresh water and reagents are mixed with the barren electrowinning solution or recycled eluant that will be used in the next elution cycle.

The fresh eluant contains 1% sugar. More sugar may be added to the recycled eluant to increase its sugar content to 2%. The recycling process starts after the carbon in the Carbon Elution Column has been deactivated by the carbon deactivator solution and the solution has been drained out of the Carbon Elution Column. It simply involves introducing fresh eluant before the recycled eluant. All gold-loaded eluants go to the Pregnant Solution Tank that feeds the electrowinning cells. Unlike the Preferred Embodiment, this additional embodiment brings the fresh eluant in contact with the fresh carbon only once until it passes through the electrowinning cells again.

This additional embodiment takes advantage of the high rate of gold elution using an eluant containing sugar to improve the overall efficiency. Savings in reagents are directly proportional to the fraction of recycled eluant being used.

Conclusions, Ramifications, and Scope

It is clear that sucrose enhances the elution of gold cyanide complexes from activated carbon. My method of eluting gold extends present knowledge of elution chemistry. Furthermore, my method has additional advantages over prior art in that:
1. it allows the use of commonly available water and reagents;
2. it allows the recycling of gold-loaded eluant containing high concentrations of gold;
3. it provides a fast elution method at 98° C. and faster still at higher temperatures;
4. it provides a gold-loaded eluant one-half the volume required by prior art;
5. it provides a gold-loaded eluant chemistry suitable for zinc precipitation or electrowinning;
6. it provides a once-through or recirculation-type elution; and
7. it provides a simple, economical, and efficient method of eluting gold from activated carbon.

The specific data in the examples described above are merely illustrative; they do not limit the scope of the invention. Various ramifications are possible within the scope of the invention. For example, operating at higher than suggested temperature will further enhance the elution of gold. The gold-loaded carbon need not be washed with acid before elution to benefit from this invention. Sugar is a carbohydrate containing carbon, hydrogen and oxygen only. The better-known carbohydrates are classified into three groups: (a) monosaccharides including sugars, such as glucose and fructose, (b) disaccharides including the sugars sucrose, maltose, and lactose, and (c) polysaccharides including cellulose, starch, and glycogen. Monosacharides are polyhydroxy aldehydes or ketones, usually referred to as aldoses and ketoses, respectively.

Thus, the scope of the invention should be determined by the appended claims and their legal equivalents, rather than by the examples given.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. The embodiments described here and above are further intended to explain best modes for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

I claim:

1. A process for recovering a precious metal from activated carbon carrying the precious metal by contacting the carbon with an eluant containing sugar.

2. The process of claim 1 wherein said sugar is a monosaccharide or disaccharide, or both.

3. The process of claim 2 wherein said monosaccharide is selected from the group consisting of aldose, and ketoses.

4. The process of claim 2 wherein said disaccharide is sucrose.

5. The process of claim 1 wherein the sugar is a polysaccharide.

6. The process of claim 1, wherein the sugar is selected from the group consisting of glucose, fructose, sucrose, maltose, lactose, and mixtures thereof.

7. The process of claim 1, wherein the precious metal is gold.

8. The process of claim 1, wherein the precious metal is in the form of gold cyanide.

9. The process of claim 1, further comprising:
recovering the precious metal from the eluant after the contacting step.

10. A process for recovering gold or silver, or both, from activated carbon by first eluting the carbon with a recycled eluant from a prior step of eluting carbon with an eluant and second eluting the carbon with fresh eluant.

11. The process of claim 10 wherein said fresh eluant and recycled eluant are from different vessels.

12. The process of claim 10 wherein said fresh eluant contains sugar.

13. The process of claim 12 wherein the sugar is a polysaccharide.

14. The process of claim 12, wherein the sugar is selected from the group consisting of glucose, fructose, sucrose, maltose, lactose, and mixtures thereof.

15. The process of claim 12, wherein the sugar is an aldose or a ketose.

16. The process of claim 10, wherein gold is adsorbed on the activated carbon.

17. The process of claim 10, wherein gold cyanide is adsorbed on the activated carbon.

18. A process for recovering a precious metal from activated carbon on which the precious metal is adsorbed, comprising:
contacting the carbon with an eluant containing at least one compound having or more saccharose units to form a loaded eluant containing at least a portion of the precious metal; and
recovering at least a portion of the precious metal from the loaded eluant.

19. The process of claim 18 wherein said compound is a monosaccharide, a disaccharide, or a polysaccharide.

20. The process of claim 18 wherein the at least a portion of the precious metal is recovered by electrowinning techniques.

21. The process of claim 18 wherein the compound is a sugar.

22. The process of claim 21, wherein the sugar is selected from the group consisting of glucose, fructose, sucrose, maltose, lactose, and mixtures thereof.

23. The process of claim 21, wherein the sugar is an aldose or a ketose.

24. The process of claim 8, wherein the precious metal is gold.

25. The process of claim 18, wherein the precious metal is in the form of gold cyanide.

26. A process for recovering a precious metal that is at least one of gold, and silver, from activated carbon on which the precious metal is adsorbed, comprising:
eluting the carbon with an eluant containing a saccharide to form a loaded eluant; and
recovering at least a portion of the precious metal from the loaded eluant.

27. The process of claim 26 wherein in the recovering step a barren eluant is produced and further comprising:

first contacting activated carbon containing a precious metal with the barren eluant to form a first loaded eluant containing a first portion of the precious metal; and second contacting the activated carbon with a fresh eluant containing sugar to form a second loaded eluant containing a second portion of the precious metal.

28. The process of claim 26 wherein said saccharide is a monosaccharide, a disaccharide, or a polysaccharide.

29. The process of claim 26, wherein the saccharide is selected from the group consisting of glucose, fructose, sucrose, maltose, lactose, and mixtures thereof.

30. The process of claim 26, wherein the saccharide is an aldose or a ketose.

31. The process of claim 26, wherein the precious metal is gold.

32. The process of claim 26, wherein the precious metal is in the form of gold cyanide.

33. A process for recovering a precious metal that is at least one of gold, and silver, from activated carbon on which the precious metal is adsorbed, comprising:

eluting the carbon with an eluant containing a carbohydrate containing only hydrogen, carbon, and oxygen to form a loaded eluant; and recovering at least a portion of the precious metal from the loaded eluant.

34. The process of claim 33 wherein in the recovering step a barren eluant is produced and further comprising:

first contacting activated carbon containing a precious metal with the barren eluant to form a first loaded eluant containing a first portion of the precious metal; and second contacting the activated carbon with a fresh eluant containing a carbohydrate containing only hydrogen, carbon and oxygen to form a second loaded eluant containing a second portion of the precious metal.

35. The process of claim 33 wherein said carbohydrate is a monosaccharide, a disaccharides, or a polysaccharide.

36. The process of claim 33, wherein the carbohydrate is selected from the group consisting of glucose, fructose, sucrose, maltose, lactose, and mixtures thereof.

37. The process of claim 33, wherein the carbohydrate is an aldose or a ketose.

38. The process of claim 33, wherein the precious metal is gold.

39. The process of claim 33, wherein the precious metal is in the form of gold cyanide.

\* \* \* \* \*

UNITED STATES PATENT AND TRADEMARK OFFICE
CERTIFICATE OF CORRECTION

PATENT NO.    : 6,200,364 B1                                         Page 1 of 1
DATED         : March 13, 2001
INVENTOR(S)   : Antonio T. Robles It is certified that error appears in the above-identified patent and that said Letters Patent is hereby corrected as shown below:

<u>Column 12,</u>
Line 36, please insert the word -- one -- between the word "having" and the words "or more".

Signed and Sealed this

Thirteenth Day of August, 2002

Attest:

Attesting Officer

JAMES E. ROGAN
*Director of the United States Patent and Trademark Office*